United States Patent
Schneider et al.

(10) Patent No.: US 9,473,444 B2
(45) Date of Patent: Oct. 18, 2016

(54) CONTENT SHARING PLATFORM PLAYLISTS AND SUBSCRIPTIONS BASED ON USER HISTORY

(71) Applicant: Google Inc., Mountain View, CA (US)

(72) Inventors: Michael Patrick Schneider, Venice, CA (US); Marion Waelchli, San Francisco, CA (US)

(73) Assignee: Google Inc., Mountain View, CA (US)

( * ) Notice: Subject to any disclaimer, the term of this patent is extended or adjusted under 35 U.S.C. 154(b) by 338 days.

(21) Appl. No.: 14/020,972

(22) Filed: Sep. 9, 2013

(65) Prior Publication Data

US 2014/0310353 A1 Oct. 16, 2014

Related U.S. Application Data

(60) Provisional application No. 61/810,666, filed on Apr. 10, 2013.

(51) Int. Cl.
*G06F 15/16* (2006.01)
*H04L 12/58* (2006.01)

(52) U.S. Cl.
CPC .............. *H04L 51/32* (2013.01); *H04L 51/16* (2013.01)

(58) Field of Classification Search
CPC ............... G06Q 30/0631; G06Q 30/0269; G06Q 50/01; H04L 67/22; H04L 65/4084; H04L 67/306; H04N 21/25891; H04N 21/26258; H04N 21/4826; G06F 17/30053
See application file for complete search history.

(56) References Cited

U.S. PATENT DOCUMENTS

| | | | |
|---|---|---|---|
| 7,818,350 B2 | 10/2010 | New et al. | |
| 8,055,655 B1 * | 11/2011 | He et al. | 707/727 |
| 8,370,874 B1 * | 2/2013 | Chang et al. | 725/46 |
| 2006/0143236 A1 | 6/2006 | Wu | |
| 2009/0064227 A1 * | 3/2009 | Eronen | G06F 17/30867 725/46 |
| 2009/0265369 A1 * | 10/2009 | Hyman et al. | 707/102 |
| 2010/0185671 A1 * | 7/2010 | Burba et al. | 707/780 |
| 2011/0154198 A1 | 6/2011 | Bachman et al. | |
| 2012/0059825 A1 * | 3/2012 | Fishman et al. | 707/737 |
| 2012/0303713 A1 * | 11/2012 | Harbick et al. | 709/204 |
| 2013/0144684 A1 * | 6/2013 | Lee et al. | 705/7.29 |
| 2014/0136441 A1 * | 5/2014 | Agarwalla et al. | 705/344 |

FOREIGN PATENT DOCUMENTS

WO 2006093980 9/2006

OTHER PUBLICATIONS

International Search Report and Written Opinion for International Patent Application No. PCT/US14/26831, mailed Aug. 25, 2014, 9 pages.

* cited by examiner

*Primary Examiner* — Brian J Gillis
*Assistant Examiner* — Shean Tokuta
(74) *Attorney, Agent, or Firm* — Lowenstein Sandler LLP

(57) ABSTRACT

A method for generating content sharing platform playlists and subscriptions based on user history is disclosed. The method includes identifying one or more entities of a content sharing platform to which a user is not subscribed, providing a user interface (UI) associated with the user, the UI displaying the identified one or more entities as recommended suggestions to the user, receiving, by the user via the UI, an indication of a selection of an entity of the identified one or more entities, generating a subscription to the selected entity for the user on the content sharing platform, using content items associated with the subscribed entity to originate a playlist for the user, and providing the playlist on the UI associated with the user.

18 Claims, 7 Drawing Sheets

200

```
┌─────────────────────────────────────────────────────────────────┐
│ Determine that a user is accessing a GUI associated with the user on a content │
│                       sharing platform                          │
│                                                             210 │
└─────────────────────────────────────────────────────────────────┘
                                 │
                                 ▼
┌─────────────────────────────────────────────────────────────────┐
│           Identify entities of current subscriptions of the user │
│                                                             220 │
└─────────────────────────────────────────────────────────────────┘
                                 │
                                 ▼
┌─────────────────────────────────────────────────────────────────┐
│  Identify entities with which the user interacted in an activity history of the user │
│                                                             230 │
└─────────────────────────────────────────────────────────────────┘
                                 │
                                 ▼
┌─────────────────────────────────────────────────────────────────┐
│ Remove identified entities with which the user is already subscribed to both of a user │
│                channel and a topic channel of the entity        │
│                                                             240 │
└─────────────────────────────────────────────────────────────────┘
                                 │
                                 ▼
┌─────────────────────────────────────────────────────────────────┐
│ Rank remaining identified entities according to at least one of a quantity and/or │
│                    frequency of access by the user              │
│                                                             250 │
└─────────────────────────────────────────────────────────────────┘
                                 │
                                 ▼
┌─────────────────────────────────────────────────────────────────┐
│       Select at most a first predetermined number of the ranked entities │
│                                                             260 │
└─────────────────────────────────────────────────────────────────┘
                                 │
                                 ▼
┌─────────────────────────────────────────────────────────────────┐
│ Display the selected entities as suggested recommendations for a playlist in a user │
│   interface of the GUI associated with the user on the content sharing platform │
│                                                             270 │
└─────────────────────────────────────────────────────────────────┘
```

Receive, from a user, selection of a suggested recommended entity of a content sharing platform
310

Determine whether the user has a user channel subscription to the selected entity and/or a topic channel subscription to the selected entity
320

For the channel subscription(s) to the entity that the user does not have, create associated subscription for the user to the entity channel
330

Display indication of subscription on homepage of the user on the content sharing platform
340

Use one or more content items associated with the channels of the selected entity as source(s) to initialize a playlist for the user
350

Generate the playlist using the source content item(s)
360

Display a UI for the generated playlist originated by the selected entity on the homepage of the user on the content sharing platform
370

FIG. 3

CONTENT SHARING PLATFORM PLAYLISTS AND SUBSCRIPTIONS BASED ON USER HISTORY

RELATED APPLICATION

This application claims the benefit under 35 U.S.C. §119(e) of U.S. Patent Provisional Application No. 61/810,666, filed on Apr. 10, 2013, the entirety of which is incorporated herein by reference.

TECHNICAL FIELD

This disclosure relates to the field of content sharing networks and, in particular, to content sharing platform playlists and subscriptions based on user history.

BACKGROUND

On the Internet, social networks allow users to connect to and share information with each other. Many social networks include a content sharing aspect that allow users to upload, view, and share content, such as video content, image content, audio content, and so on. Other users of the social network may comment on the shared content, discover new content, locate updates, share content, and otherwise interact with the provided content. The shared content may include content from professional content creators, e.g., movie clips, TV clips, and music videos, as well as content from amateur content creators, e.g., video blogging and short original videos.

A social network with content sharing capabilities, such as a content sharing platform, may provide centralized locations for a content owner to showcase their content. These centralized locations are sometimes known as a channel. The channel may be presented by the content sharing platform via one or more channel pages. The channel may be used by a content owner to convince new viewers to subscribe to content of the content owner. Furthermore, a channel may be used by a content owner as a central location for subscribed viewers to comment on content, find the latest updates, and discover new content from the channel owner.

Similar to a television or radio experience, when users identify a favorite channel, they typically prefer to watch or listen to that channel without interruptions or having to decide what to watch next. Some content sharing platforms allow users to create playlists that allow the user to create a list of favorite media items to automatically play without interruption. However, generation of such playlists is a manual process that can take time and resources to understand and enable. Moreover, these playlists quickly get repetitive and outdated as channels continually release new material.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, a method for generating content sharing platform playlists and subscriptions based on user history is disclosed. The method includes identifying one or more entities of a content sharing platform to which a user is not subscribed, providing a user interface (UI) associated with the user, the UI displaying the identified one or more entities as recommended suggestions to the user, receiving, by the user via the UI, an indication of a selection of an entity of the identified one or more entities, generating a subscription to the selected entity for the user on the content sharing platform, using content items associated with the subscribed entity to originate a playlist for the user, and providing the playlist on the UI associated with the user.

In one implementation, the identified one or more entities are identified based on at least one of current channel subscriptions of the user or an activity history of the user on the content sharing platform. In addition, the identifying the one or more entities of the method may further include determining entities associated with activity history content items that occur in the activity history of the user at least one of more than a predetermined number of occurrences over a time interval or more than a predetermined frequency of occurrences over the time interval. In some implementations, each of the one or more entities uploads content items to the content sharing platform for users of the content sharing platform to access. In other implementations, each of the one or more entities is associated with at least one of a user channel of the content sharing platform or a topic channel of the content sharing platform.

Furthermore, the playlist described above may include a plurality of content items that stream to the user without interruption. Furthermore, the playlist may include one or more other content items that are not associated with the subscribed entity. The identifying feature of the method may also include determining content items viewed by the user; for each content item viewed by the user, determining other content items with a co-occurrence of views across users of the content sharing platform, and selecting the one or more entities with a number of the other content items that exceeds a threshold.

In one implementation, the determining the other content items with the co-occurrence of views further comprises accessing a data structure of co-occurrences to identify the other content items, wherein the data structure comprises an entry for each content item of the content sharing platform that comprises a list of the other content items for the entry having the co-occurrence of views for the entry. In addition, the user may also be a member of a social network separate from the content sharing platform, and wherein connections of the user on the social network are used to identify the one or more entities.

In additional implementations, computing devices for performing the operations of the above described implementations are also disclosed. Additionally, in implementations of the disclosure, a computer readable storage media stores methods for performing the operations of the above described implementations.

BRIEF DESCRIPTION OF THE DRAWINGS

The present disclosure is illustrated by way of example, and not by way of limitation, in the figures of the accompanying drawings.

FIG. 2 is a flow diagram illustrating a method for generating recommendations for content sharing platform playlists and subscriptions based on user history, according to some implementations of the disclosure.

FIG. 3 is a flow diagram illustrating a method for generating content sharing platform playlists and subscriptions based on user history, according to an implementation of the disclosure.

DETAILED DESCRIPTION

Implementations are described for content sharing platform playlists and subscriptions based on user history. In one implementation, a content sharing platform utilizes subscriptions and activity history of a user to originate an automatically-generated playlist for the user. This playlist can be promoted to the user on a homepage of the user or any other user interface (e.g., a GUI presented by a mobile application). The user is presented with a list of entities (e.g., content artists such as music artists) based on the user's subscriptions and activity history. When the user selects one of these listed entities, the user receives an automatically-generated playlist originated by that selected entity, as well as a connection (e.g., subscription, friending, liking, etc.) to the entity that is automatically-generated without the user's interaction. In one implementation, the playlist includes content items from the entity, as well as content items from similar entities.

In one implementation, a method of the disclosure includes identifying one or more entities of a content sharing platform to which a user is not subscribed via at least one channel and providing a user interface (UI) associated with the user, the UI displaying the identified one or more entities as recommended suggestions to the user. The method further includes receiving, by the user via the UI, an indication of a selection of an entity of the identified one or more entities. In addition, the method includes generating a subscription to a channel associated with the selected entity for the user on the content sharing platform. The method may also include using content items associated with the selected entity to originate a playlist for the user, wherein the playlist comprises one or more other content items that are not associated with the selected entity, and providing the playlist on the UI associated with the user.

Implementations of the disclosure have a different layer of granularity than previous solutions for finding and consuming content on content sharing platforms. Previously, a user could play content from their subscribed channels one at a time, and the user had to make a decision after each content item finished about which content item to watch next. This resulted in a high frequency of decisions and interactions in a short period of time with the content sharing platform, creation of friction and discontentment in the content sharing platform experience for the user. Implementations of the disclosure overcome these disadvantages by removing the need to make such frequent decisions by generating an automatic playlist for the user based on the user's subscriptions and activity history and also providing automatic subscriptions for the user to increase user integration with the content sharing platform.

Figure 1:
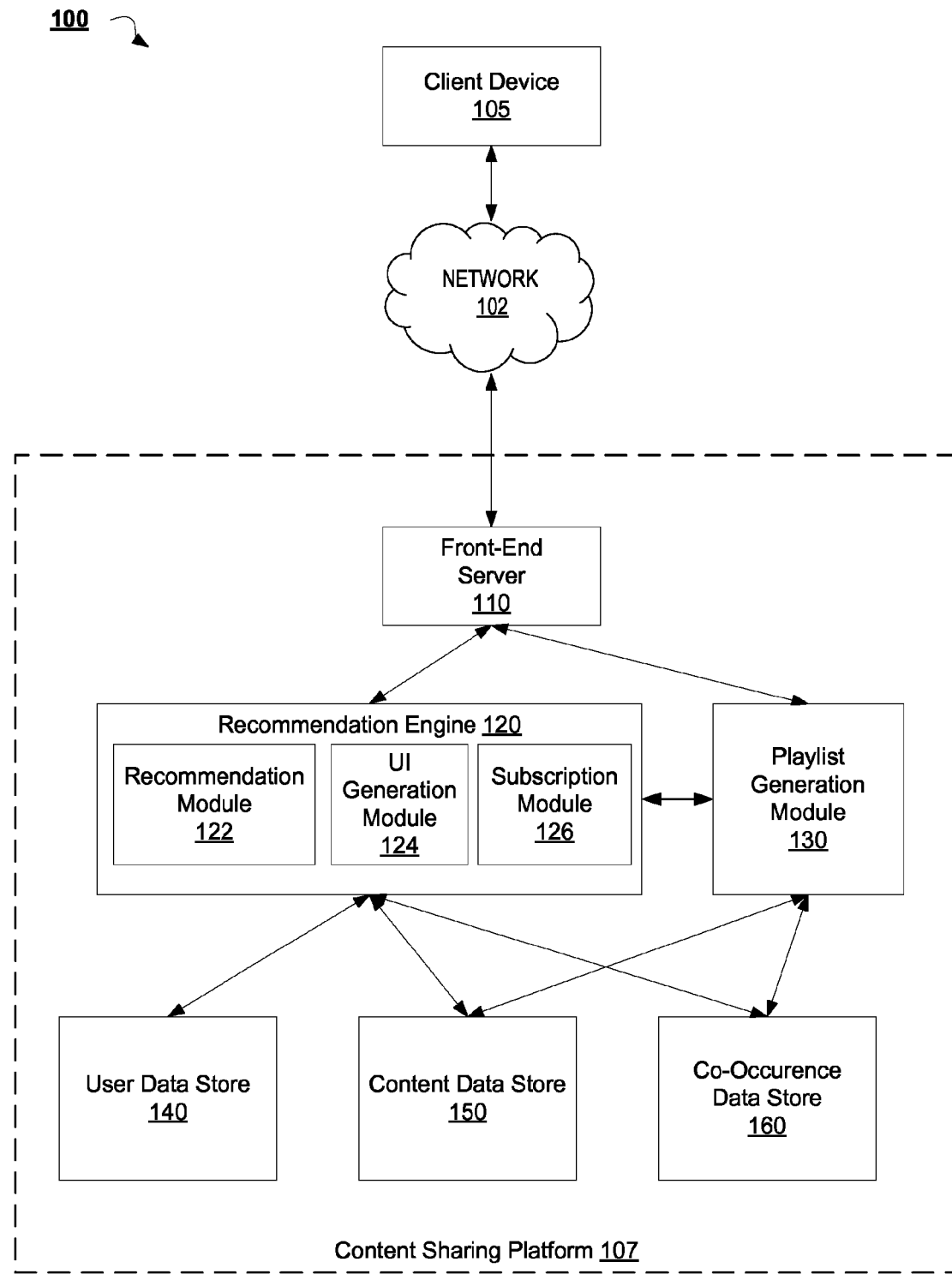
FIG. 1 is a block diagram illustrating an exemplary network architecture in which implementations of the disclosure may be used.

FIG. 1 is a block diagram illustrating an exemplary network architecture 100 in which implementations of the disclosure may be used. The network architecture 100 includes a client device 105 communicably coupled to a content sharing platform 107 via a network 102. In some implementations, content sharing platform 107 is also known as a content sharing platform. The network 102 includes the Internet in one implementation. In other implementations, other networks, wired and wireless, such as an intranet, local area network (LAN), wide area network (WAN), or broadcast network may be used as or be part of network 102.

Content sharing platform 107 is a social network that allows users to connect to and share information and content items with each other. Many social networks include a content sharing aspect that allow users to upload, view, tag, and share content, such as video content, image content, audio content, and so on. Other users of the social network may comment on the shared content, discover new content, locate updates, share content, and otherwise interact with the provided content. The shared content may include content from professional content creators, e.g., movie clips, TV clips, audio clips, and music videos, as well as content from amateur content creators, e.g., video blogging and short original videos. In some implementations, the shared content is stored in content data store 150 of content sharing platform 107.

As illustrated, content sharing platform 107 includes front-end server 110, a recommendation engine 120, a playlist generation module 130, a user data store 140, a content data store 150, and a co-occurrence data store 160. A data store may include, but is not limited to, a table, a database, a directory, a repository, and one or more files, to name a few examples.

Content sharing platform 107 is capable of operating within a single server device or on multiple server devices. For example, although each of front-end server 110, recommendation engine 120, playlist generation module 130, user data store 140, content data store 150, and co-occurrence data store 160 are depicted in FIG. 1 as single, disparate components, these components may be implemented together in a single device or networked in various combinations of multiple different devices that operate together. Examples of devices may include, but are not limited to, servers, mainframe computers, networked computers, process-based devices, and similar type of systems and devices.

One or more client devices 105 may be in communication with the front-end server 110 over the network 102. The client device 105 may be any type of computing device, for example, a device including a processor, a computer-readable medium, and a memory. The client device 105 may be, for example, a personal computer, a laptop computer, a tablet computer, a personal digital assistant (PDA), a cellular telephone, other mobile devices, etc. In some implementations, the client device 105 may be executing a browser application or other application adapted to communicate over Internet related protocols (e.g., TCP/IP and HTTP) and/or display a user interface. While only a single client device 105 is shown in FIG. 1, network architecture 100 may support a large number of concurrent sessions with many client devices 105.

During operation of network architecture 100, a user may access content sharing platform 107 via client device 105 over network 102. The front-end server 110 receives communications from the client device 105, and processes and/or directs these communications accordingly. In one implementation, the front-end server 110 comprises a processing device and a computer-readable memory.

In one implementation, the client device 105 may run an operating system (not shown) that manages hardware and software of the client device 105. A browser (not shown) may execute on the client device 105 (e.g., on the OS of the client machines). The browser may be a web browser that can access content served by a content sharing platform 107 by navigating to web pages provided by the content sharing platform 107 (e.g., using the hypertext transport protocol (HTTP)). The browser may issue queries and commands to the content sharing platform 107, such as commands to access a specific content item, commands to share a content item, commands to optimize the content item, and so forth.

In some implementations, client device 105 includes applications that are associated with a service provided by content sharing platform 107. Examples of a client device that may use such applications ("apps") include mobile phones, "smart" televisions, tablet computers, and so forth. The applications or apps may access content provided by content sharing platform 107, issue commands to content sharing platform 107, receive content from content sharing platform 107, and so on without visiting web pages of content sharing platform 107.

Via an app or a browser, the client device 105 may access content items provided by content sharing platform 107. In one implementation, the content items are provided as a channel or other content source that clients may subscribe to. Users may select content items for viewing via the app or browser. The app or browser of the client device 105 may then receive content items that are maintained by content sharing platform 107. Additionally, the client device 105 may also upload content items to the content sharing platform 107 for storage in a repository, such as content data store 150 via the app or browser.

In general, functions described in one implementation as being performed by the content sharing platform 107 can also be performed on the client device 105 in other implementations if appropriate. In addition, the functionality attributed to a particular component can be performed by different or multiple components operating together. The content sharing platform 107 can also be accessed as a service provided to other systems or devices through appropriate application programming interfaces, and thus is not limited to use in websites.

In one implementation, content sharing platform 107 provides a centralized location for a user to showcase objects related to the user, such as information and content pertaining to the user. In one implementation, an object includes a post, a content item (e.g., audio, video, image), a comment, a message, an email message, a status update, a favorability indication (e.g., a like), a subscription event, a tagging event, a viewing event (e.g., click), and so on. The centralized location is sometimes known as a user page or a channel. In addition, the representation of the user on the content sharing platform 107 may sometimes be referred to as an "entity".

As discussed above, a channel can be data content available from a common source or data content having a common topic or theme. The data content can be media content chosen by a user, media content made available by a user, media content uploaded by a user, media content chosen by a content provider, media content chosen by a broadcaster, etc. In some implementations, a channel is created and owned by a user of the content sharing platform 107, and may be referred to as a user channel. In other implementations, a channel may be generated and owned by the content sharing platform 107 to be used as a central location for all content related to a certain topic, and may be referred to as a topic channel.

Front-end server 110 is communicably coupled to recommendation engine 120 and playlist generation module 130, which each may reside on the same machine as front-end server 110 or a different machine. Each of recommendation engine 120 and playlist generation module 130 may be implemented in hardware, software, firmware, or any combination of the above.

In implementations of the disclosure, recommendation engine 120 identifies and provides content recommendations to a user of the content sharing platform 107 for use in generating a new connection (e.g., subscription, friend, etc.) for the user to an entity associated with the content recommendations and originating (e.g., seeding, initializing, etc.) a playlist for the user. A playlist can be defined as a collection of one or more content items from entities of the content sharing platform that can be viewed in sequential or shuffled order without interaction from the user. In one implementation, recommendation engine 120 includes a recommendation module 122, a UI generation module 124, and a subscription module 126.

When a user accesses the content sharing platform 107, they are directed to a home page of the user or another GUI representing a home page of the user. The home page may include a recommendation UI generated by recommendation engine 120. In one implementation, this recommendation UI includes one or more entities of the content sharing platform 107 that are identified by recommendation module 122 based on current subscriptions of the user and/or an activity history of the user. Subscriptions may include a connection between the user and another entity on the content sharing platform. In some implementations, a subscription includes friending an entity, liking an entity, following an entity, and so on. Although the description herein references the term subscription, other terms denoting a connection between a user and an entity of the content sharing platform are also encompassed.

Recommendation module 122 may access user subscription data store 140 to identify all subscriptions of a user. The subscriptions of the user may include subscriptions to user channels and subscriptions to topic channels of the content sharing platform 107. In addition, an activity history, which may be maintained in the user data store 140, may be accessed to identify content interests of the user. The activity history may include a history of content items previously viewed by the user, content items liked by the user, playlist manually generated by the user, connections from other social networks external to the content sharing platform 107 indicating interests of the user, and so on.

Based on one or both of the existing user subscriptions and the activity history of the user, the recommendation module 122 may determine entities of the content sharing platform 107 represented by the subscriptions and/or activities. Then the recommendation module 122 may select one or more of these entities to provide to UI generation module 124 for presentation as a recommendation to the user. For example, the identified entities may be ranked according to quantity and frequency of interaction by the user, and the top X number of entities in this list selected. In one implementation, if a user is subscribed to both the user channel for an entity and the topic channel for the entity, then the entity is not selected as one of the recommendations by recommendation module 122.

UI generation module 124 may then generate a UI for display on the home page of the user to present these selected entities to the user for the user's selection purposes.

In one implementation, a UI includes a document, a portion of document, or a set of documents rendered in HyperText Markup Language (HTML).

When the user selects one of the recommended entities from the UI, the recommendation engine 120 performs two actions. The first action is for the subscription module 126 to subscribe the user to the topic channel and/or user channel for the entity. The second action is to pass the subscribed channel to the playlist generation module 130 for use as a source to generate and/or initialize a new playlist for display on the homepage of the user.

With respect to the first action, the subscription module 122 receives the indication of the user's selection, via the provided UI, of one of the recommended entities. The subscription module 122 may then determine which of the channels (i.e., user and/or topic) they user does not have a subscription to for the entity. Then, the subscription module creates a subscription for the user to the topic and/or user channel that the user is not subscribed to for the selected entity. This subscription is then displayed to the user on the home page of the user as one of the user's current subscriptions. The subscription information may also be stored in the user data store 140.

With respect to the second action, the recommendation engine 120, for example via the subscription module 126, may pass the selected entity to the playlist generation module 130. In one implementation, the playlist generation module 130 may be an application programming interface (API) or servlet configured to access the content data store 150 to select one or more content items associated with the entity to use as a source to initialize a playlist. In other implementations, the playlist generation module 130 may be a server device configured to perform those tasks. The playlist may include content items generated by the entity as well as content items generated by entities that are similar to the entity. For example, playlist generation module 130 may reference co-occurrence data store to identify one or more content items with a high co-occurrence rate to content items of the entity used to initialize the playlist, and select these identified one or more content items for inclusion in the generated playlist.

Once a playlist is generated, the playlist generation module 130 may provide the playlist to the user via a UI on the homepage of the user. In one implementation, the playlist generation module 130 may work in conjunction with the UI generation module 122 to provide this playlist. In other implementations, the playlist generation module provides the playlist utilizing its own UI generation logic. During viewing of the content items of the generated playlist, the user may access and subscribe to other entities associated with the content items of the playlist. For example, when a content item of playlist is shown during performance of the playlist, an icon or link to subscribe to the entity associated with the content item may be provided in the UI next to an icon and/or description of the currently-playing content item of the playlist.

In some implementations, the generated playlists (e.g., a playlist object comprising the source content item identifier(s), user identifier, number of videos, etc.) may be associated with an identifier and stored in a data store (not shown) of the content sharing platform 107. As a result, the generated playlist may be persisted on the homepage of the user for any subsequent visits by the user.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

FIG. 2 is a flow diagram illustrating a method 200 for generating recommendations for content sharing platform playlists and subscriptions based on user history, according to some implementations of the disclosure. The method 200 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 200 may be performed by recommendation engine 120 of content sharing platform 107, as shown in FIG. 1.

Referring to FIG. 2, at block 210, method 200 begins when the recommendation engine determines that user is accessing a home page or other GUI associated with the user on the content sharing platform. In one implementation, a front-end server may send a signal to the recommendation engine of such access by the user. Then, at block 220, entities of current subscriptions of the user are identified. In one implementation, a user data store maintaining user subscription information for each user may be referenced to identify the subscriptions and their associated entities on the content sharing platform. A subscription to an entity may include both a user channel subscription that is generated and owned by the entity and a topic channel subscription that is generated by the content sharing platform to collect all content on the content sharing platform that is associated with the entity (but not necessarily generated by the entity).

Then, at block 230, one or more entities are identified from an activity history of the user. The activity history may include a history of content items previously viewed by the user, content items liked by the user, playlists manually generated by the user, connections from other social networks external to the content sharing platform indicating interests of the user, and so on. The entities associated with these content items may be determined, for example, via a lookup of the content item and its associated originator. In some implementations, a filter may be applied to these determined entities to return those entities whose occurrences in the activity history of the user exceed a predetermined number of occurrences and/or exceed a predetermined frequency of occurrences. This filter may be applied over the entire span of the user's activity history or during a predetermined interval of the user's activity history. In one implementation, a system administrator of the content sharing platform may establish the configuration for identifying entities from the activity history.

At block 240, the identified entities that the user is subscribed to via the user channel and/or the topic channel associated with the entity are removed from consideration. Subsequently, at block 250, the remaining identified entities are ranked according to at least one of a quantity and/or a frequency of access by the user. Then, at block 260, a predetermined number of the highest ranked entities are selected by the recommendation engine. If the number of ranked entities is less than the predetermined number, then the entire set of ranked entities may be selected.

Lastly, at block 270, the selected entities are displayed as suggested recommendations for a playlist for the user. These selected entities may be displayed in the GUI associated with the user (e.g., a homepage of the user) on the content sharing platform. In one implementation, a thumbnail image of each of the selected entities is used as a representation of the entity in the suggested recommendation UI. In other implementations, different combinations of description and images may be utilized in the suggested recommendations UI.

FIG. 3 is a flow diagram illustrating a method 300 for generating content sharing platform playlists and subscriptions based on user history, according to an implementation of the disclosure. The method 300 may be performed by processing logic that comprises hardware (e.g., circuitry, dedicated logic, programmable logic, microcode, etc.), software (e.g., instructions run on a processing device to perform hardware simulation), or a combination thereof. In one implementation, method 300 may be performed by recommendation engine 120 and playlist generation module 130 of a content sharing platform 107, as shown in FIG. 1.

Referring to FIG. 3, at block 310, method 300 begins when a selection of suggested recommended entity is received from a user. In one implementation, the selection is received via a UI provided one or more suggested recommendations of entities for which the user could select from to generate a playlist. For example, the user may select an entity from the UI generated at block 270 of FIG. 2.

At block 320, the recommendation engine determines whether the user already has either or both of a user channel subscription to the selected entity and/or a topic channel subscription to the selected entity. In some cases, a user may have one or the other of the channel subscriptions, while in other cases, the user may have neither of the channel subscriptions. At block 330, for the channel subscriptions to the entity that the user does not have, the recommendation engine creates an associated channel subscription for the user to the entity channel. In one implementation, the recommendation engine adds the channel subscription to a user data store maintaining the subscriptions associated with the user.

At block 340, an indication of the subscription is displayed on a home page of the user on the content sharing platform. Then, at block 350, one or more content items associated with the channel(s) of the selected entity are used as source(s) to initialize a playlist generated for the user. In one implementation, the one or more content items may be accessed from a content data store of the content sharing platform. For example, content item IDs associated with the entity may be used as the source for initialization of the playlist.

Then, at block 360, the playlist is generated using the source content item(s). In one implementation, a co-occurrence data store is referenced with the content item IDs of the source items to select one or more other content items that are related (in terms of co-occurrence views across the content sharing platform) to the source items, and these selected content items may be used to populate the playlist. As a result, content items associated with the selected entity, as well as related content items associated with other entities, may be provided to the user as part of the playlist without other interaction from the user.

Lastly, at block 370, a UI for the generated playlist is displayed on the homepage of the user on the content sharing platform. In one implementation, the playlist UI includes a description of the selected entity used to originate the playlist, as well as a list of the content items populating the playlist (and optionally a description associated with each content item).

Figure 4A:
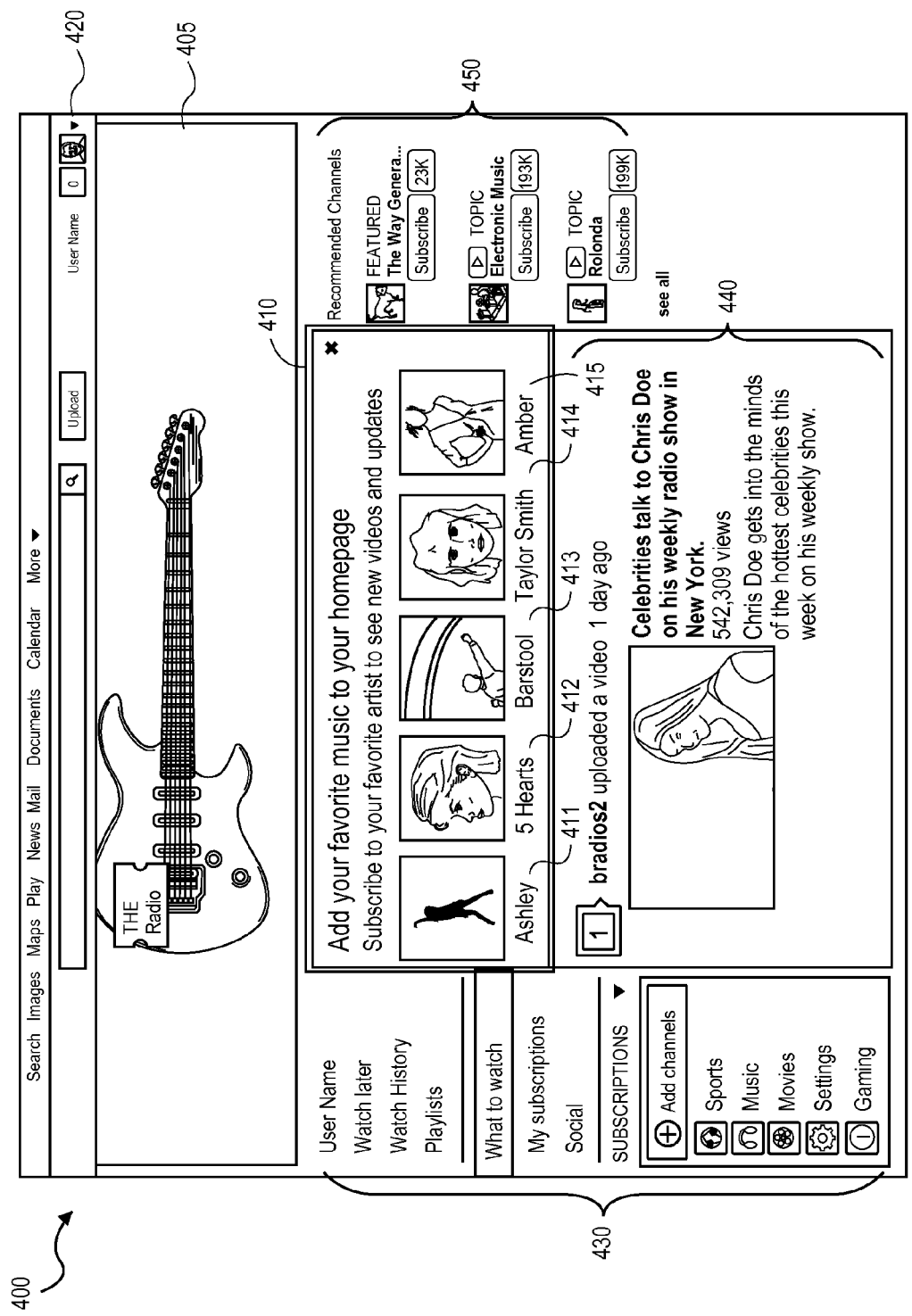
FIGS. 4A, 4B, and 4C are example screenshots of a home page user interface providing content sharing platform playlists and subscriptions based on a history of the user, according to implementations of the disclosure.
Figure 4B:
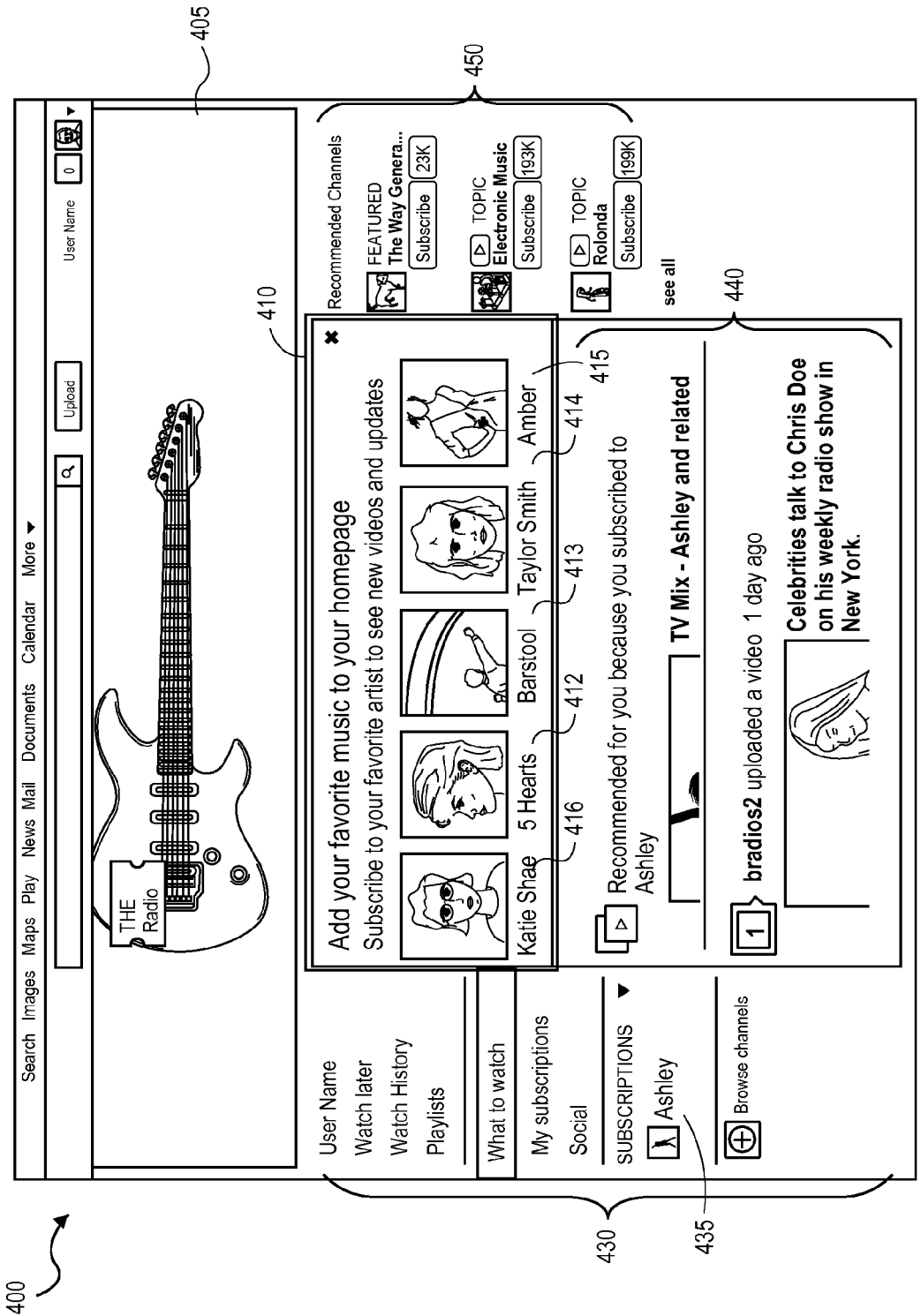
Figure 4C:
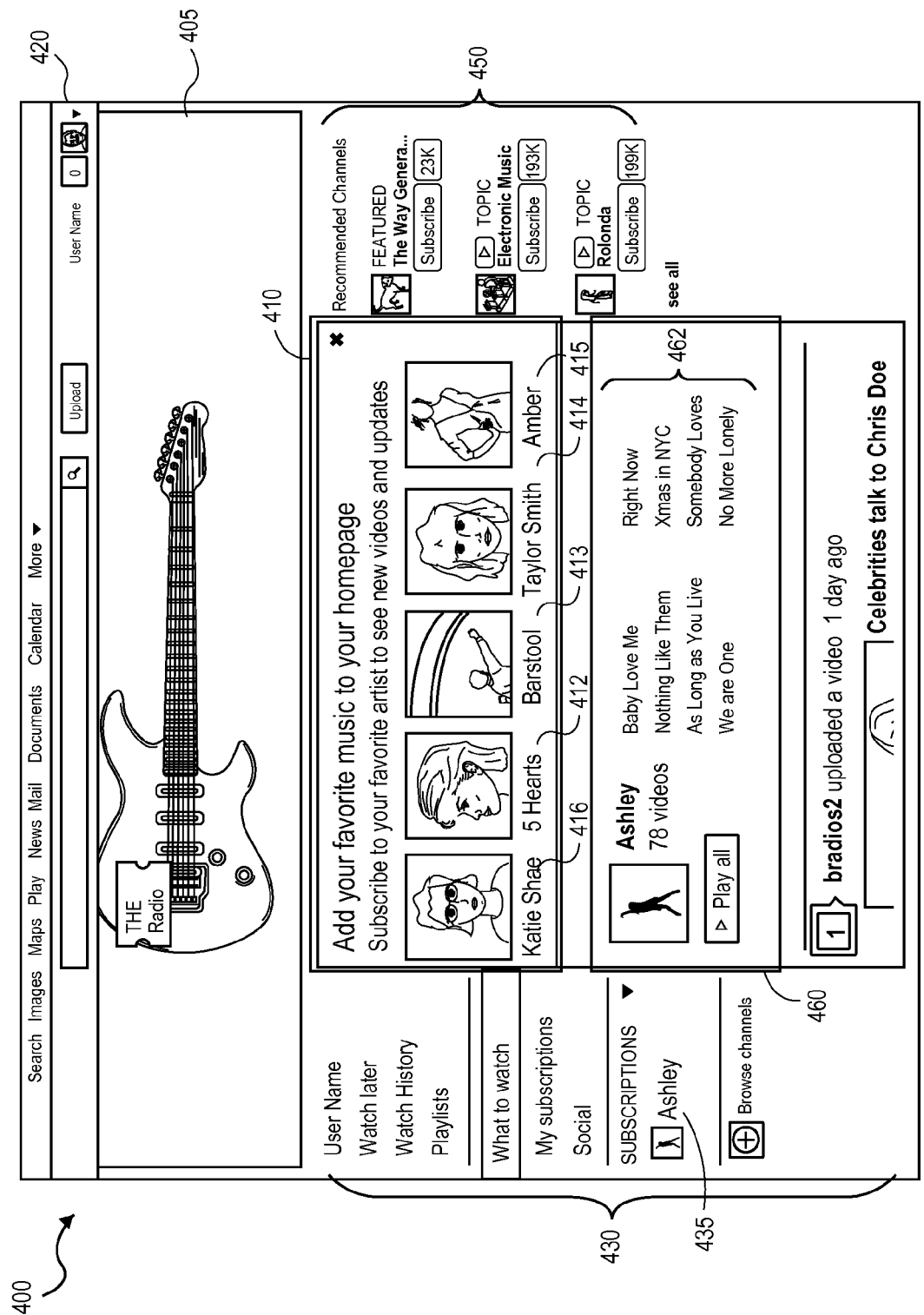

FIGS. 4A, 4B, and 4C illustrate example screenshots of GUI 400 (e.g., user channel GUI or user home page GUI) providing content sharing platform playlists and subscriptions based on a history of the user, according to implementations of the disclosure. Referring to FIG. 4A, an example screenshot of a GUI 400 provided to a user of a content sharing platform is shown. GUI 400 may include a header section 405 identifying the GUI. In addition, a search bar 420 may be included in the GUI. The GUI 400 also includes a recommended suggestions section 410, which may be generated as described above with respect to FIG. 1 and method 200 of FIG. 2. As illustrated, the recommended suggestions section UI 410 includes entities 411-415 suggested to the user based on existing user subscriptions and/or user activity history.

The GUI 400 may also include items, such as side bars 430, 450 and page content 440, that are controlled by the content sharing platform and personalized based on the user. The side bars 430, 450 may provide menus for navigation and shortcuts to the overall content sharing platform. In some implementations, these side bars are not specific to the GUI 400. In one implementation, the page content 440 may include activity feed information specific to the user.

Referring to FIG. 4B, the GUI 400 of FIG. 4B is shown after the user has selected entity 411 from recommended suggestions section 410 of FIG. 4A. As illustrated, entity 411 has been removed from recommended suggestions section 410 and a new recommended suggestion entity 416 has taken its place. In addition, the new subscription to entity 411 is shown in side bar 430 as subscription 435. For example, entity 411 may be added as a user subscription according to the description above with respect to FIG. 1 and method 300 of FIG. 3.

Referring to FIG. 4C, the GUI 400 of FIG. 4C is shown after the subscribed, selected entity 411, 435 is used as a source to initialize a playlist shown in playlist section 460. As shown, playlist section 460 includes an identifier (e.g., thumbnail and title) of the selected and subscribed entity 411, 435 and at least a portion of a list of content items 462 that populate the generated playlist.

Figure 5:
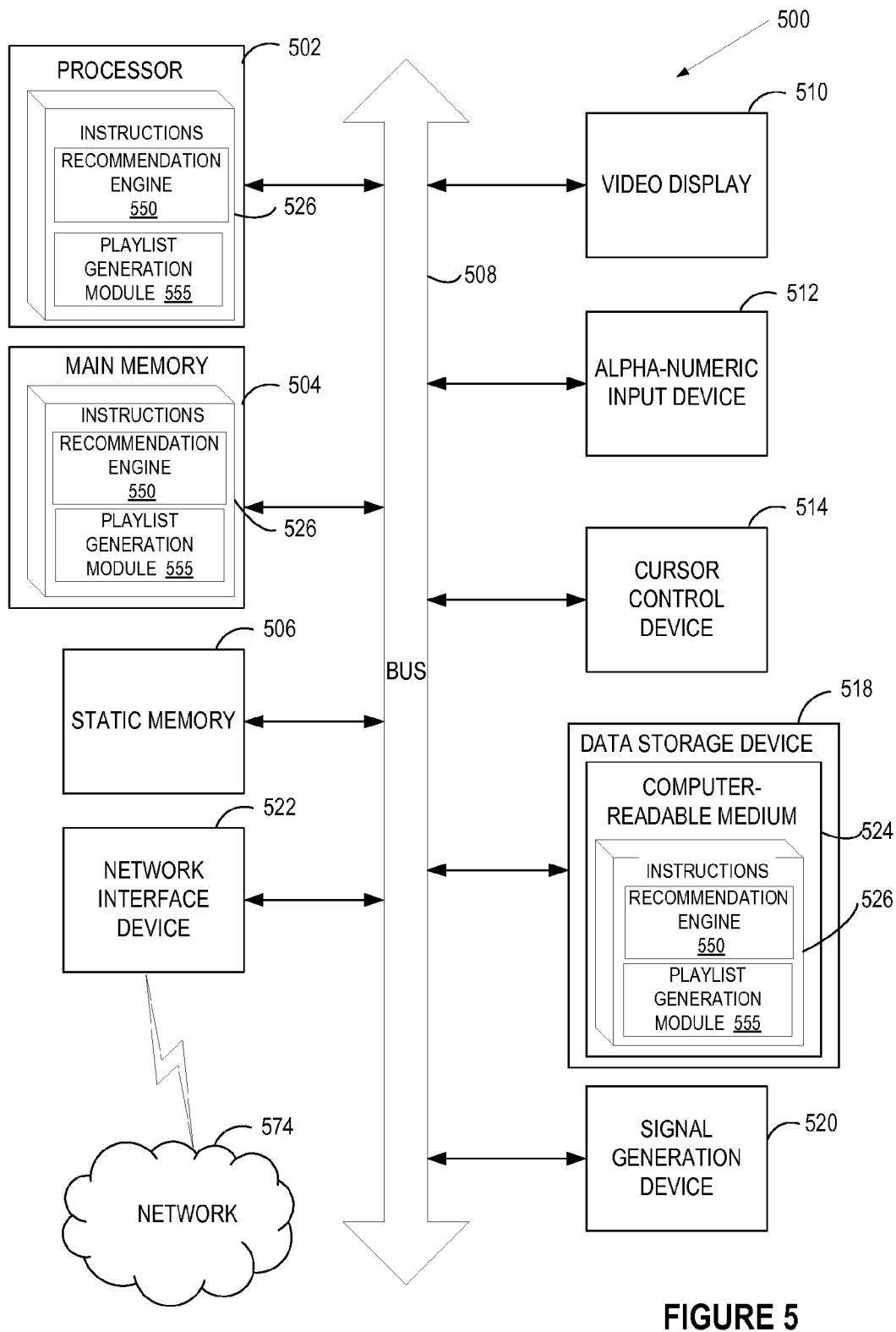
FIG. 5 is a block diagram illustrating an exemplary computer system, according to some implementations.

FIG. 5 illustrates a diagrammatic representation of a machine in the exemplary form of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 522. The computer system 500 also may include a video display unit 510 (e.g., a liquid crystal display (LCD), a cathode ray tube (CRT), or a touch screen), an alphanumeric input device 512 (e.g., a keyboard), a cursor control device 514 (e.g., a mouse), and a signal generation device 520 (e.g., a speaker).

The data storage device 518 may include a computer-readable storage medium 524 on which is stored one or more sets of instructions 526 (e.g., software) embodying any one or more of the methodologies or functions described herein. The instructions 526 may also reside, completely or at least partially, within the main memory 504 and/or within the processor 502 during execution thereof by the computer system 500, the main memory 504 and the processor 502 also constituting computer-readable storage media. The instructions 526 may further be transmitted or received over a network 574 via the network interface device 522.

In one embodiment, the instructions 526 include instructions for a recommendation engine 550 and a playlist generation module 555, which may correspond, respectively, to recommendation engine 120 and playlist generation module 130 of FIG. 1, and/or a software library containing methods that call a recommendation engine and playlist generation engine for generation content sharing platform playlists and subscriptions based on a user history. While the computer-readable storage medium 524 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
  identifying, by a processing device, channels that a user is not subscribed to on a content sharing platform and that are to be recommended to the user, the identifying based on current channel subscriptions of the user and content accessed by the user on the content sharing platform, wherein the identifying further comprises:
    determining content items viewed by the user;
    for a content item viewed by the user, identifying other content items with a co-occurrence of views with the content item across users of the content sharing platform; and
    identifying ones of the channels comprising at least a threshold number of the other identified content items;
  generating a graphical user interface (GUI) for the user, the GUI providing the identified channels as recommended suggestions to the user;
  receiving, via the GUI, an indication of a user selection of one of the identified channels;
  subscribing, by the processing device, the user to the selected channel on the content sharing platform;
  generating, by the processing device without interaction by the user, a playlist for the user, the playlist comprising content items corresponding to the selected channel; and
  transmitting, via the GUI, the playlist to the user.

2. The method of claim 1, wherein the identifying the channels further comprising determining channels associated with activity history content items that occur in an activity history of the user at least one of more than a predetermined number of occurrences over a time interval or more than a predetermined frequency of occurrences over the time interval.

3. The method of claim 1, wherein each of the channels comprises content items uploaded to the content sharing platform for the users of the content sharing platform to access.

4. The method of claim 1, wherein the channels comprise user channels of the content sharing platform.

5. The method of claim 1, wherein the playlist comprises a plurality of content items that stream to the user without interruption, and wherein the playlist comprises one or more other content items that are not associated with the subscribed channel.

6. The method of claim 1, wherein the determining the other content items with the co-occurrence of views further comprises accessing a data structure of co-occurrences to identify the other content items, wherein the data structure comprises an entry for each content item of the content sharing platform that comprises a list of the other content items for the entry having the co-occurrence of views for the entry.

7. The method of claim 1, wherein the user is also a member of a social network separate from the content sharing platform, and wherein connections of the user on the social network are used to identify the channels.

8. A non-transitory machine-readable storage medium storing instructions which, when executed, cause a processing device to perform operations comprising:
  providing a user interface (UI) of a content sharing platform associated with a user, the UI displaying channels as recommended suggestions to the user, wherein the channels comprise channels to which the user is not subscribed and that are to be recommended to the user, wherein the channels are identified based on current channel subscriptions of the user and an activity history of the user on the content sharing platform, and wherein the providing the UI further comprises:
    determining content items viewed by the user;
    for a content item viewed by the user, identifying other content items with a co-occurrence of views with the content item across users of the content sharing platform; and
    identifying ones of the channels comprising at least a threshold number of the other identified content items;
  receiving, via the UI, an indication of a user selection of one of the selected channels;
  subscribing the user to the selected channel on the content sharing platform;
  generating, by the processing device without interaction by the user, a playlist for the user, the playlist comprising content items corresponding to the selected channel; and
  transmitting, via the GUI, the playlist to the user.

9. The non-transitory machine-readable storage medium of claim 8, wherein the channels comprise at least one of a user channel of the content sharing platform or a topic channel of the content sharing platform.

10. The non-transitory machine-readable storage medium of claim 8, wherein the determining the other content items with the co-occurrence of views further comprises accessing a data structure of co-occurrences to identify the other content items, wherein the data structure comprises an entry for each content item of the content sharing platform that comprises a list of the other content items for the entry having the co-occurrence of views for the entry.

11. The non-transitory machine-readable storage medium of claim 8, wherein the user is also a member of a social network separate from the content sharing platform, and wherein connections of the user on the social network are used to identify the one or more channels.

12. The non-transitory machine-readable storage medium of claim 8, wherein the playlist comprises a plurality of content items that stream to the user without interruption, and wherein the playlist comprises one or more other content items that are not associated with the subscribed channel.

13. A system comprising:
a processing device;
a memory to store a plurality of content items; and
a processing device coupled to the memory, the processing device to execute a recommendation engine from the memory and to:
identify channels that a user is not subscribed to on a content sharing platform and that are to be recommended to the user, the identifying based on current channel subscriptions of the user and content accessed by the user on the content sharing platform, wherein identifying the channels further comprises the processing device to:
determine content items viewed by the user;
for a content item viewed by the user, identify other content items with a co-occurrence of views with the content item across users of the content sharing platform; and
identifying ones of the channels comprising at least a threshold number of the other identified content items;
generate a graphical user interface (GUI) for the user, the GUI providing the identified channels as recommended suggestions to the user;
receive, via the GUI, an indication of a user selection of one of the identified channels;
subscribe the user to the selected channel on the content sharing platform;
generate, without interaction by the user, a playlist for the user, the playlist comprising content items corresponding to the selected channel; and
transmit, via the GUI, the playlist to the user.

14. The system of claim 13, wherein each of the channels comprises content items uploaded to the content sharing platform for users of the content sharing platform to access.

15. The system of claim 13, wherein the processing device to determine the other content items with the co-occurrence of views further comprises the processing device to access a data structure of co-occurrences to identify the other content items, wherein the data structure comprises an entry for each content item of the content sharing platform that comprises a list of the other content items for the entry having the co-occurrence of views for the entry.

16. The method of claim 1, wherein the channels comprise topic channels of the content sharing platform.

17. The non-transitory machine-readable storage medium of claim 8, wherein each of the channels comprises content items uploaded to the content sharing platform for the users of the content sharing platform to access.

18. The system of claim 13, wherein each of the channels comprise at least one of a user channel of the content sharing platform or a topic channel of the content sharing platform.

* * * * *